(12) United States Patent
Matsui

(10) Patent No.: US 8,620,522 B2
(45) Date of Patent: Dec. 31, 2013

(54) SUPPRESSING ELECTRICAL FAILURE EFFECTS IN SERVO CONTROL SYSTEMS

(75) Inventor: Gen Matsui, Bothell, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 13/115,909

(22) Filed: May 25, 2011

(65) Prior Publication Data

US 2012/0303210 A1    Nov. 29, 2012

(51) Int. Cl.
*G06F 7/00*    (2006.01)

(52) U.S. Cl.
USPC ................................ 701/36; 701/3

(58) Field of Classification Search
None
See application file for complete search history.

(56) References Cited

U.S. PATENT DOCUMENTS

| | | | |
|---|---|---|---|
| 4,807,516 A | | 2/1989 | Takats |
| 5,806,805 A | * | 9/1998 | Elbert et al. ................. 244/195 |
| 7,464,903 B2 | | 12/2008 | Pitt |
| 7,600,715 B2 | | 10/2009 | Matsui |
| 7,637,458 B2 | | 12/2009 | Near et al. |
| 7,789,345 B2 | | 9/2010 | Matsui et al. |
| 7,870,726 B2 | | 1/2011 | Matsui |
| 7,913,955 B2 | | 3/2011 | Jones |
| 2002/0149331 A1 | * | 10/2002 | Marcinkiewicz ............. 318/254 |

* cited by examiner

*Primary Examiner* — James Trammell
*Assistant Examiner* — Jerrah Edwards
(74) *Attorney, Agent, or Firm* — Caven & Aghevli LLC

(57) ABSTRACT

Systems to manage servo controls are disclosed. In some embodiments servo controls may implemented in systems to deflect control surfaces in aircraft. In one embodiment, a system to manage the output of a servo valve comprises a first plurality of feedback loops to receive a plurality of commands representative of a desired piston position and to generate, from the plurality of commands, a plurality of position difference signals which represent a difference between a desired piston position and a current piston position, a plurality of amplifiers to generate, from the plurality of position difference signals, a corresponding plurality of magnetic flux target signals, a second plurality of feedback loops to receive, from the plurality of amplifiers, the plurality of magnetic flux target signals, wherein the magnetic flux target signals represent a desired magnetic flux measurement in the servo valve, and to generate, from the plurality of magnetic flux target signals, a plurality of magnetic flux difference signals which represent a difference between a desired magnetic flux measurement and a current magnetic flux measurement, and an assembly to regulate the servo valve using the plurality of magnetic flux target signals. Other embodiments may be described.

18 Claims, 3 Drawing Sheets

US 8,620,522 B2

SUPPRESSING ELECTRICAL FAILURE EFFECTS IN SERVO CONTROL SYSTEMS

BACKGROUND

Aircraft include movable control surfaces for directional control in flight. Such control surfaces can include ailerons for roll control, elevators for pitch control, and rudders for yaw control.

Hydraulic drive systems with linear actuators have been used for control surfaces and other control surface systems. Servo valves are used in hydraulic actuators to regulate the flow of hydraulic fluid, which then affects the position of a piston in the hydraulic actuator, and therefore the force of the actuator.

The servo valve position may be controlled by the magnetic flux generated by one or more coils, and therefore may be referred to as an Electrohydraulic Servo Valve (EHSV) or a Direct Drive Valve (DDV). A failure which causes an erroneous level of current to flow through the coil may cause the actuator to move to a position or output a force that is not consistent with the expected output of the control system. Such a failure could cause the aircraft to deviate from a controlled course and/or cause structural damage to components of the aircraft. Accordingly, systems and methods to control servo systems which, in turn, manage control surfaces may find utility.

SUMMARY

Embodiments of systems and methods in accordance with the present disclosure may provide improved systems and methods to control drive surfaces in vehicles, e.g., aircraft. More specifically, embodiments described herein provide for redundancy and feedback control in servo control systems.

In one embodiment, a method to manage the output of a servo valve, comprises receiving a plurality of commands representative of a desired piston position, generating, from the plurality of commands, a plurality of position difference signals which represent a difference between a desired piston position and a current piston position, generating from the plurality of position difference signals a plurality of magnetic flux target signals, wherein the magnetic flux target signals represent a desired magnetic flux measurement in the servo valve, generating, from the plurality of magnetic flux target signals, a plurality of magnetic flux difference signals which represent a difference between a desired magnetic flux measurement and a current magnetic flux measurement, and regulating the servo valve using the magnetic flux difference signals.

In another embodiment, a system to manage the output of a servo valve, comprises a first plurality of feedback loops to receive a plurality of commands representative of a desired piston position and to generate, from the plurality of commands, a plurality of position difference signals which represent a difference between a desired piston position and a current piston position, a plurality of amplifiers to generate, from the plurality of position difference signals, a corresponding plurality of magnetic flux target signals, a second plurality of feedback loops to receive, from the plurality of amplifiers, the plurality of magnetic flux target signals, wherein the magnetic flux target signals represent a desired magnetic flux measurement in the servo valve, and to generate, from the plurality of magnetic flux target signals, a plurality of magnetic flux difference signals which represent a difference between a desired magnetic flux and a current magnetic flux; and an assembly to regulate the servo valve using the plurality of magnetic flux difference signals.

In yet another embodiment, an aircraft comprises a fuselage and wings, at least one moveable control surface coupled to at least one of the fuselage and wings, a servo valve coupled to a piston which deflects the at least one moveable control surface and a system to manage the output of the servo valve. The system comprises a first plurality of feedback loops to receive a plurality of commands representative of a desired piston position and to generate, from the plurality of commands, a plurality of position difference signals which represent a difference between a desired piston position and a current piston position, a plurality of amplifiers to generate, from the plurality of position difference signals, a corresponding plurality of magnetic flux target signals, a second plurality of feedback loops to receive, from the plurality of amplifiers, the plurality of magnetic flux target signals, wherein the magnetic flux target signals represent a desired magnetic flux measurement in the servo valve, and to generate, from the plurality of magnetic flux target signals, a plurality of magnetic flux difference signals which represent a difference between a desired magnetic flux and a current magnetic flux, and an assembly to regulate the servo valve using the plurality of magnetic flux difference signals.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods to control servo drives which may be used, e.g., to manage control surfaces in aircraft are described herein. Specific details of certain embodiments are set forth in the following description and in FIGS. 1-3 to provide a thorough understanding of such embodiments. One skilled in the art will understand, however, that alternate embodiments may be practiced without several of the details described in the following description.

Figure 1:
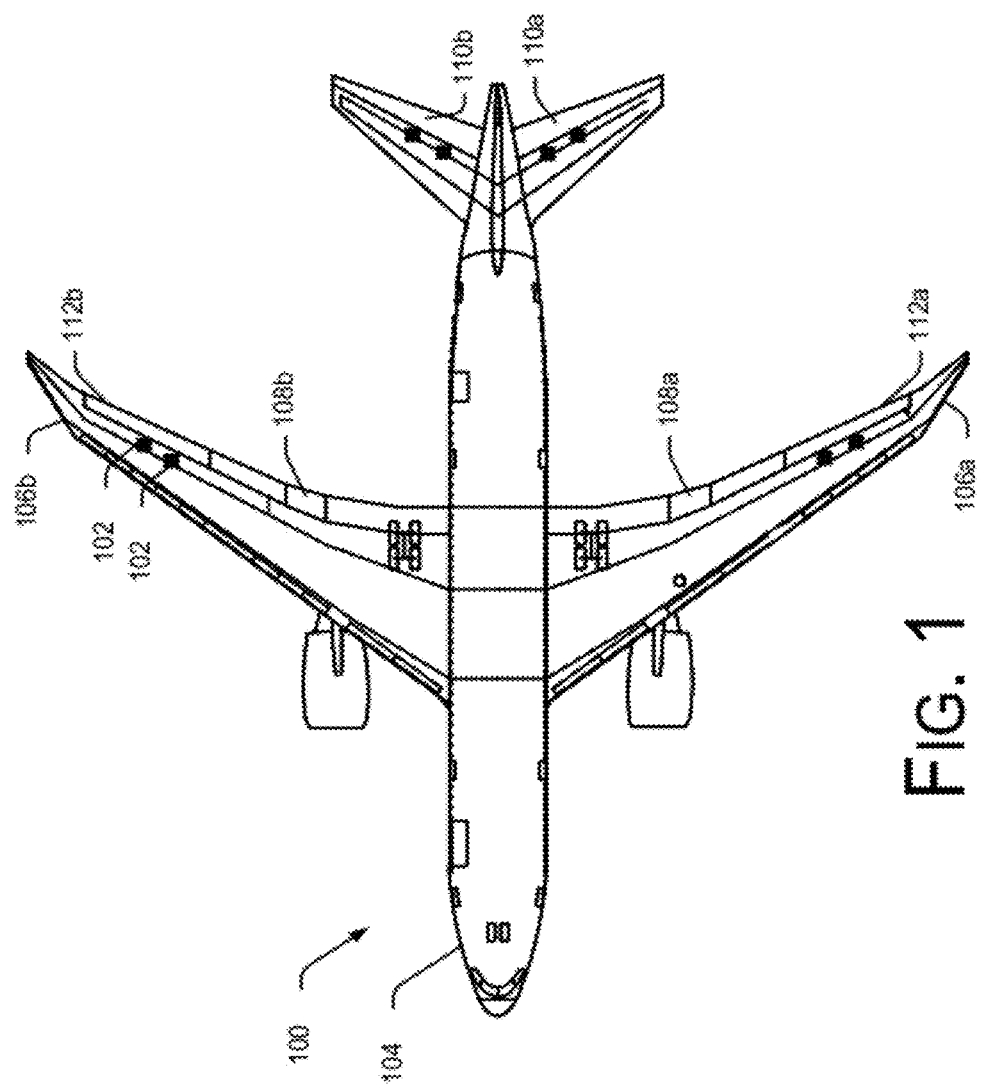
FIG. 1 is a partially schematic, top view of an aircraft having a control system in accordance with embodiments.

FIG. 1 is a partially schematic, top view of an aircraft 100 having one or more control surface actuation systems 102 configured in accordance with an embodiment of the invention. In one aspect of this embodiment, the aircraft 100 includes a fuselage 104 and wings 106 (shown as first and second wings 106a and 106b) fixedly attached to the fuselage. Each wing 106 can include a number of movable control surfaces for controlling the aircraft 100 during flight. These control surfaces may include flaperons 108a, 108b, collectively referred to by reference numeral 108, elevators 110a, 110b, collectively referred to as 110, and ailerons 112a, 112b, collectively referred to as 112.

In operation, the flight control actuation system 102 can extend or retract linear actuators to deflect the elevators up or down, which causes the aircraft to pitch nose up or down. Similarly, the ailerons, rudder, flaperons, and spoilers, may be deflected to generate the desired effects on the airplane.

Figure 2:
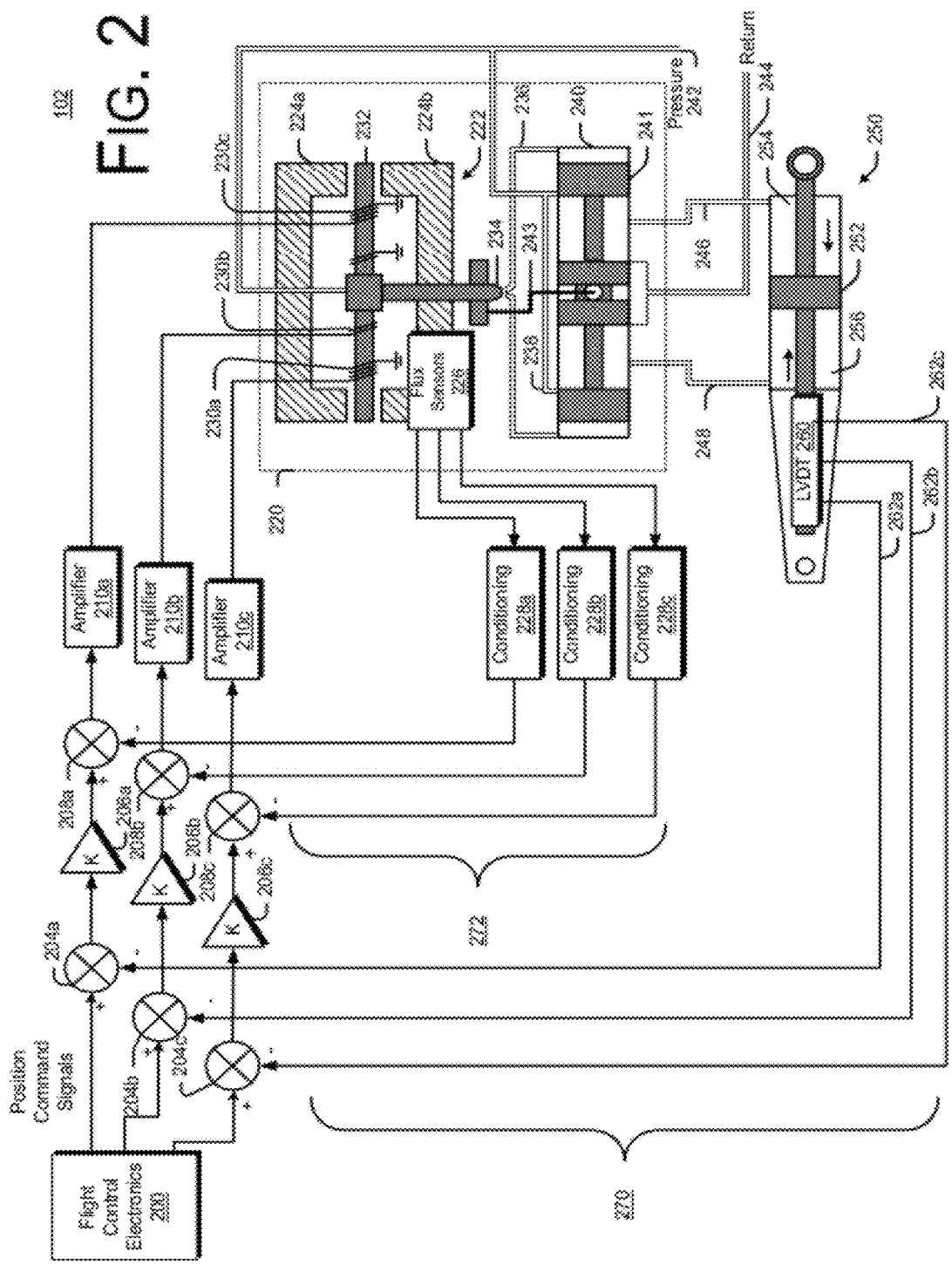
FIG. 2 is a schematic illustration of a system to manage the output of a servo valve, according to embodiments.
Figure 3:
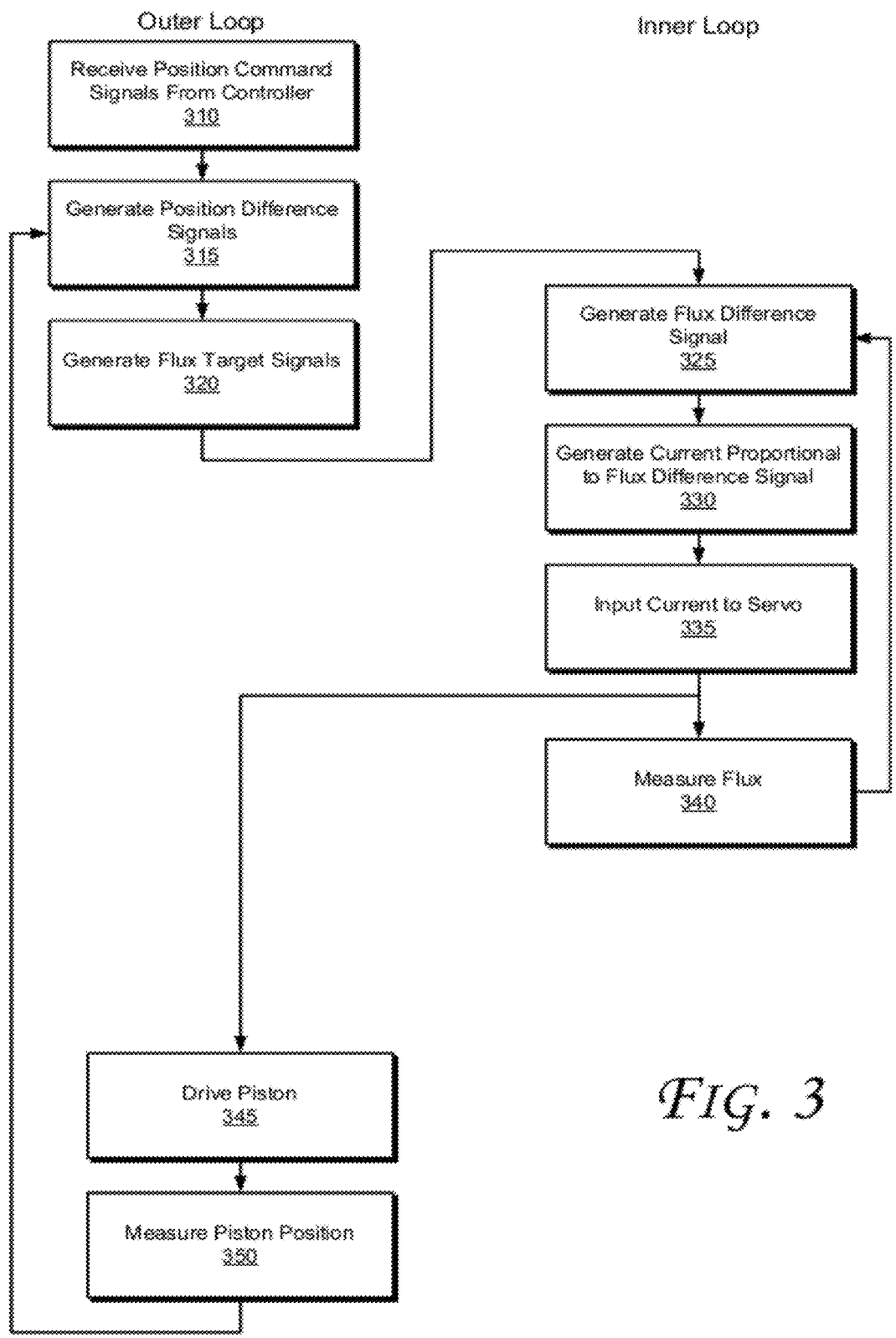
FIG. 3 is a flowchart illustrating high-level operations of a method to manage the output of a servo valve, according to embodiments.

FIG. 2 is a schematic illustration of a flight control actuation system 102 which implements techniques to manage the output of a servo valve that drives the piston which, in turn, deflects a control surface, according to embodiments. FIG. 3 is a flowchart illustrating high-level operations of a method to manage the output of a servo valve, according to embodiments.

Referring to FIGS. 2-3, in some embodiments the control system 102 comprises a first plurality of position feedback loops, generally indicated by reference numeral 270 to receive a plurality of commands representative of a desired piston position and to generate, from the plurality of commands, a plurality of position difference signals which represent a difference between a desired piston position and a current piston position, a plurality of amplifiers to generate, from the plurality of position difference signals, a corresponding plurality of magnetic flux target signals, a second plurality of magnetic flux feedback loops 272 to receive, from the plurality amplifiers, the plurality of magnetic flux target signals, wherein the magnetic flux target signals represent a desired magnetic flux in the servo valve 220, and to generate, from the plurality of magnetic flux target signals, a plurality of magnetic flux difference signals which represent a difference between a desired magnetic flux and a current magnetic flux, and an assembly to regulate the servo valve 220 using the magnetic flux difference signals.

In the embodiment depicted in FIG. 2 the system comprises flight control electronics 200, summing junctions 204a, 204b, 204c, amplifiers 206a, 206b, 206c, summing junctions 208a, 208b, 208c, amplifiers 210a, 201b, 201c, a two-stage electrohydraulic servo valve (EHSV) 220 that includes three electrically independent magnetic flux sensors 226, conditioners 228a, 228b, 228c, and a piston assembly 250 to that includes a position measuring assembly indicated LVDT 260 (linear variable differential transformer) comprising three electrically independent position sensors. Like components may be identified by reference numerals followed by an alphabetical identifier, e.g., 204a, 204b, 204c. Such components may be collectively referred to herein by the reference numeral, e.g., 204. The EHSV 220 comprises a torque motor 222 and a spool valve 240.

In the embodiment depicted in FIG. 2 the system receives three commands from a flight control electronics 200 (operation 310). By way of example, flight control electronics 200 may represent a "fly by wire" flight control electronics for an aircraft for an aircraft. In the embodiment depicted in FIG. 2 the flight control electronics 200 inputs three commands, which are identical under normal operating circumstances. The commands are input into summing junctions 204. The summing junctions 204 combine the commands with feedback signals 262 from the LVDT 260 and generate (operation 315) a signal representative of the difference between the current piston position as indicated by the LVDT 260 and the commands input by flight control electronics 200.

The signals output from the summing junctions 204 are amplified by amplifiers 206 to generate (operation 320) a signal that is representative of a target level of magnetic flux in the torque motor 222 that corresponds to the difference between the current piston position as indicated by the LVDT 260 and the commands input by flight control electronics 200. The signals output from amplifiers 206 are input into summing junctions 208, which combines the signals with feedback signals from the magnetic flux sensors 226 and generate (operation 325) a signal representative of the difference between the current level of magnetic flux and the target level of magnetic flux in the torque motor 222.

The signals output from summing junctions 208 are input into current amplifiers 210, which generate electric currents (operation 330) corresponding to the inputs and applies them to the servo coils 230a, 230b, 230c, collectively referred to by reference numeral 230 (operation 335). The application of current to coils 230 generates a magnetic flux in torque motor 222. Three magnetic flux sensors 226 measure (operation 340) the total amount of magnetic flux in motor 222, including the magnetic flux generated by permanent magnets 224a, 224b, collectively referred to by reference numeral 224.

The outputs of the magnetic flux sensors are directed to conditioning units 228a, 228b, 228c, collectively referred to by reference numeral 228. Under normal operating conditions the outputs from the magnetic flux sensors 226 should be substantially nearly identical. The conditioning units 228 may implement operations to extract the useful component of the sensor output signal, e.g., by subtracting the magnetic flux contribution of the permanent magnets 224 and leaving the magnetic flux generated by the coils 230. In some embodiments the system 102 may be activated and the magnetic flux generated by the permanent magnets 224 may be measured when the coils 230 are not charged with current. The reading generated by the magnetic flux sensors 226 may be stored in a memory in a flight control electronics. The condition units 228 may subtract this value from the reading generated by the magnetic flux sensor 226 when the coils 230 are active to obtain a measurement of the magnetic flux generated by the coils 230. The output of the conditioning units 228 input into the summing junctions 206.

Electrical current in the coils 230 creates a magnetic flux, which generates a torque applied on the armature 232. The torque thus applied causes the armature and thus the pipe 234 to deflect, resulting in the fluid pressure in one end of the spool valve 240 to rise, while that in the other end to fall. The pressure difference thus created causes the spool 241 to slide in the direction away from the higher-pressure side and towards the low-pressure side. The displacement of the spool 241 deflects the feedback spring 243 and creates a torque applied on the pipe 234 in the direction opposing the torque created by the magnetic magnetic flux. The spool stops where the torque created by the magnetic flux and the deflection of the feedback spring 243 are balanced. Spool displacement causes the pressurized fluid supply line 238 to be connected to either chamber 254 via fluid line 246 or chamber 256 via fluid line 248, and non-pressurized return line 244 to be connected to the other chamber via the other fluid line, depending on the direction of spool displacement.

Thus, when pressurized fluid is directed into chamber 254 by spool valve 240 the piston 252 is moved in the direction of LVDT 260 to deflect a control surface in one direction, e.g., trailing-edge down. By contrast, when pressurized fluid is directed into the chamber 256 by spool valve 240 the piston 252 is moved in the opposite direction to deflect a control surface in the other direction, e.g., trailing edge up. The LVDT measures the piston position (operation 350) and generates three output signals which indicate the distance that the piston 252 is displaced. The output signals are provided as feedback to the summing junctions 204.

Thus, the control system 102 provides a first position feedback loop indicated by reference numeral 270 which combines real-time feedback about the position of the piston 252 with the commands input from flight control electronics 200 via summing junctions 204. The difference signal generated by summing junctions 204 is amplified by amplifiers 206 and fed into the second feedback loop indicated by reference numeral 272 as the signal representing the desired total magnetic flux generated by the three coils. Within the second magnetic flux feedback loop 272, the magnetic flux sensor 226 measures the sum of the magnetic flux generated by the three torque motor coils 230 and the torque motor permanent magnet 224. The conditioners 228 each receive a signal representing this measurement and subtract the permanent magnet contribution, leaving the total magnetic flux generated by the three torque motor coils 230. The summing junctions 208 determine the difference between the signal representing the desired total magnetic flux input by amplifiers 206 and the signal representing the current total magnetic flux generated by the three torque motor coils 230, and the current amplifiers 210 output a current proportional thereto.

The embodiment depicted in FIG. 2 provides three redundant signals. Thus, when a failure in one or more of the signals in one of the lines of either feedback loop or in a device generating a signal representing the desired piston position causes an erroneous current to flow through a torque motor coil 230, the resulting magnetic flux is sensed by the magnetic flux sensor 226 in the other two lines of the position control loops. This, in turn, causes a current to flow in the other two torque motor coils and create a magnetic flux opposing that which is created by the erroneous current. Further, the second feedback loop 272 has a quicker response time than the first feedback loop 270. Thus, the piston position and output force can be suppressed to an insignificant level.

One skilled in the art will recognize that various alternate embodiments may be implemented. By way of example, although the embodiment depicted in FIG. 2 illustrates three separate feedback loops for the piston position sensor and three separate feedback loops for the magnetic flux detector, any number of independent loops (i.e., dual, quadruple, etc.) may be used. Further, while the control loops are fundamentally electrically independent as described, one skilled in the art will recognize that even if independence is partially breached through use of a common device, the fault suppression capability still remains for failures that may occur in the remainder of the control loops; in such a case, the common device should be monitored by a separate means to ensure proper operation. Still further, while each amplifier 210 drives a single coil 230 in the embodiment depicted in FIG. 2, one skilled in the art will recognize that each amplifier could drive two or more coils 230. Still further, one skilled in the art will recognize that a sensor could measure the total current flowing through coils 230 as a proxy for measuring the magnetic flux. Still further, although the embodiment depicted in FIG. 2 illustrates a system receiving three commands from a flight control electronics 200 (operation 310), one skilled in the art will recognize this representation encompasses a variety of configurations, such as receiving one high-integrity command from one flight control electronics unit by a plurality of receivers or receiving a plurality of commands each from a separate flight control electronics unit.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Various functional components of the system 102 may be implemented as logic instructions which may be executed on a general purpose processor or on a configurable flight control electronics. By way of example, in some embodiments the summing junctions 204, 208, amplifiers 206, 210, and conditioners 210 may be implemented either as logic or as logic instructions. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

For example, in some embodiments a computer program product may comprise logic instructions stored on a computer-readable medium which, when executed, configure a flight control electronics to detect whether a system management memory module is in a visible state, in response to a determination that system management memory is in a visible state, direct one or more system management memory input/output operations to a system management memory module, and in response to a determination that system management memory is in an invisible state, direct system management memory cache write back operations to the system management memory module and direct other system management memory input/output operations to another location in a system memory.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment. In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, flight control electronics, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method to manage the output of a servo valve, comprising:
   receiving a plurality of commands representative of a desired piston position;
   generating, from the plurality of commands, a plurality of position difference signals which represent a difference between a desired piston position and a current piston position;
   generating, from the plurality of position difference signals, a plurality of magnetic flux target signals, wherein the magnetic flux target signals represent a desired magnetic flux measurement in the servo valve;
   generating, from the plurality of magnetic flux target signals, a plurality of magnetic flux difference signals which represent a difference between a desired magnetic flux measurement and a current magnetic flux measurement; and
   regulating the servo valve using the magnetic flux difference signals, wherein regulating the servo valve using the magnetic flux difference signals comprises:
     generating a magnetic flux by inducing a level of electrical coil current corresponding to the magnetic flux difference signal;
     measuring the total magnetic flux in a servo torque motor coupled to the servo valve;
     adjusting the magnetic flux measurement by compensating for the magnetic flux contribution attributable to one or more permanent magnets in the servo motor.

2. The method of claim 1, wherein receiving a plurality of commands representative of a desired piston position comprises receiving a plurality of commands from flight control electronics.

3. The method of claim 1, wherein generating, from the plurality of commands, a plurality of position difference signals which represent a difference between a desired piston position and a current piston position comprises combining the plurality of commands with feedback signals from a position sensor coupled to the piston.

4. The method of claim 1, wherein generating, from the plurality of position difference signals, a plurality of magnetic flux target signals, wherein the magnetic flux target signals represent a desired magnetic flux measurement in the servo valve, comprises amplifying the plurality of position difference signals.

5. The method of claim 1, wherein generating, from the plurality of magnetic flux target signals, a plurality of magnetic flux difference signals which represent a difference between a desired magnetic flux measurement and a current magnetic flux measurement comprises combining the plurality of magnetic flux target signals with feedback signals from magnetic flux sensors which measure magnetic flux.

6. The method of claim 1, wherein regulating the servo valve using the flux target signals comprises adjusting a current flowing through a first flux control loop in response to a change in a current flowing through a second flux control loop.

7. A system to manage the output of a servo valve, comprising:
   a first plurality of feedback loops to receive a plurality of commands representative of a desired piston position and to generate, from the plurality of commands, a plurality of position difference signals which represent a difference between a desired piston position and a current piston position;
   a plurality of amplifiers to generate, from the plurality of position difference signals, a corresponding plurality of magnetic flux target signals;
   a second plurality of feedback loops to receive, from the plurality of amplifiers, the plurality of magnetic flux target signals, wherein the magnetic flux target signals represent a desired magnetic flux measurement in the servo valve, and to generate, from the plurality of magnetic flux target signals, a plurality of magnetic flux difference signals which represent a difference between a desired magnetic flux measurement and a current magnetic flux measurement; and
   an assembly to regulate the servo valve using the plurality of magnetic flux difference signals, wherein the assembly to regulate the servo valve comprises:
     a plurality of current amplifiers and coils to generate a magnetic flux by inducing a level of coil current corresponding to the magnetic flux difference signal;
     a plurality of magnetic flux sensors to measure the total magnetic flux in a servo torque motor coupled to the servo valve;
     a plurality of conditioners to adjust the magnetic flux measurements by compensating for the magnetic flux contribution attributable to one or more permanent magnets in the servo torque motor.

8. The system of claim 7, wherein the first plurality of feedback loops receives a plurality of commands from a flight control electronics.

9. The system of claim 7, wherein the first plurality of feedback loops combines the plurality of commands with feedback signals from a position sensor coupled to the piston.

10. The system of claim 7, wherein the second plurality of feedback loops combines the plurality of magnetic flux target signals with feedback signals from magnetic flux sensors which measure magnetic flux.

11. The system of claim 7, further comprising logic to adjust a current flowing through a first flux control loop in response to a change in a current flowing through a second flux control loop.

12. The system of claim 11, further comprising:
   a hydraulic assembly to adjust a position of a piston which regulates a control surface in response to the magnetic flux generated in the servo valve.

13. An aircraft, comprising:
a fuselage and wings;
at least one moveable control surface coupled to at least one of the fuselage and wings;
a servo valve coupled to a piston which deflects the at least one moveable control surface; and
a system to manage the output of the servo valve, comprising:
   a first plurality of feedback loops to receive a plurality of commands representative of a desired piston position and to generate, from the plurality of commands, a plurality of position difference signals which represent a difference between a desired piston position and a current piston position;
   a plurality of amplifiers to generate, from the plurality of difference signals, a corresponding plurality of magnetic flux target signals;
   a second plurality of feedback loops to receive, from the plurality of amplifiers, the plurality of magnetic flux target signals, wherein the magnetic flux target signals represent a desired magnetic flux measurement in the servo valve, and to generate, from the plurality of magnetic flux target signals, a plurality of magnetic flux difference signals which represent a difference between a desired magnetic flux and a current magnetic flux; and
an assembly to regulate the servo valve using the magnetic flux difference signals, wherein the assembly to regulate the servo valve comprises:
   a plurality of current amplifiers and coils to generate a magnetic flux by inducing a level of coil current corresponding to the magnetic flux difference signal;
   a plurality of magnetic flux sensors to measure the total magnetic flux in a servo torque motor coupled to the servo valve;
   a plurality of conditioners to adjust the magnetic flux measurements by compensating for the magnetic flux contribution attributable to one or more permanent magnets in the servo torque motor.

14. The aircraft of claim 13, wherein the first feedback loop receives a plurality of commands from flight control electronics.

15. The aircraft of claim 13, wherein the first plurality of feedback loops combines the plurality of commands with feedback signals from a position sensor coupled to the piston.

16. The aircraft of claim 13, wherein the second plurality of feedback loops combines the plurality of magnetic flux target signals with feedback signals from magnetic flux sensors which measure magnetic flux.

17. The aircraft of claim 13, further comprising logic to adjust a current flowing through a first flux control loop in response to a change in a current flowing through a second flux control loop.

18. The aircraft of claim 13, further comprising:
a hydraulic assembly to adjust a position of a piston which regulates a control surface in response to the magnetic flux generated in the servo valve.

* * * * *